(No Model.)

L. S. TRAVERS.
MEAT HANGER.

No. 569,142. Patented Oct. 6, 1896.

Attest:
M. S. Winston.
W. C. Hetzel.

Inventor:
L. S. Travers,
By E. B. Whitmore, Atty.

UNITED STATES PATENT OFFICE.

LAWRENCE S. TRAVERS, OF PALMYRA, NEW YORK, ASSIGNOR OF TWO-THIRDS TO GEORGE R. BROWN, OF SAME PLACE, AND WILLIAM A. JUDD, OF CLIFTON SPRINGS, NEW YORK.

MEAT-HANGER.

SPECIFICATION forming part of Letters Patent No. 569,142, dated October 6, 1896.

Application filed July 29, 1895. Serial No. 557,490. (No model.)

*To all whom it may concern:*

Be it known that I, LAWRENCE S. TRAVERS, of Palmyra, in the county of Wayne and State of New York, have invented a new and useful Improvement in Meat-Hangers, which improvement is fully set forth in the following specification and shown in the accompanying drawings.

My invention relates to improvements in meat hooks or hangers, and more particularly to devices adapted to be attached to hams, bacon, or other bodies of meat, either uncovered or in sacks, by means of which said bodies or masses may be conveniently suspended or hung up.

The device consists of a single piece, preferably of metal, as spring-wire, formed into a frame having two main parts connected by a spring-bend, with the free ends of the main parts bent or doubled to form hooks, having dull rounded ends and inwardly-turned pointed terminals or needles.

The object of my invention is to so construct this hanger or suspending device that when in use the pointed terminals or needles will be relieved of most or all of the weight of the mass of meat and thus not liable to be bent or broken by it.

A further object of this invention is to produce a simple and practical device for suspending a mass of meat, which may be readily attached to said mass and which will not be liable to become detached therefrom, and a device which shall be cheap, durable, and of convenient and extensive application.

Figure 1:
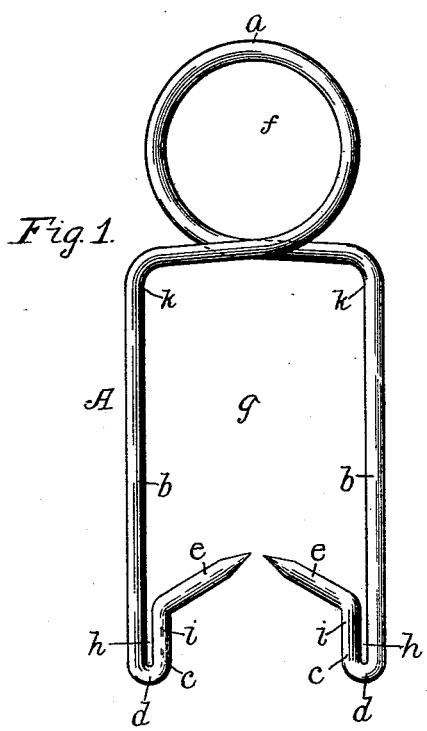
Figure 2:
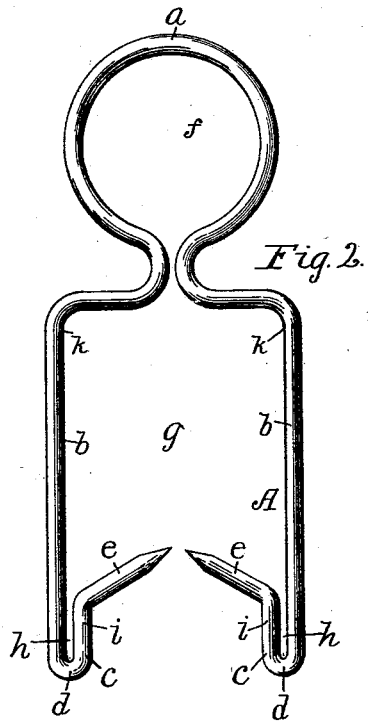
Figure 3:
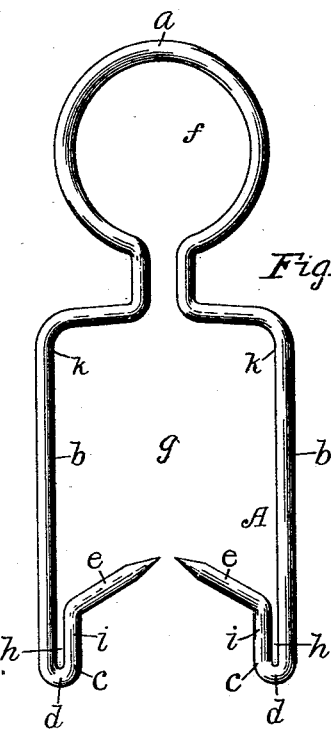

Referring to the drawings, Figure 1 is a side elevation of the meat-hanger in the form in which it is preferably made. Figs. 2 and 3 are simple modifications in the form of the spring-bend or upper part of the device.

In the drawings, A represents my improved meat hook or hanger, which may be made of different sizes and weight of metal, according to the use to which it is to be applied.

The device is formed as to essential parts with a spring-bend $a$, hanging-loop $f$, and arms $b\,b$ with hooks $c\,c$, rounded ends $d\,d$, and pointed terminals or needles $e\,e$ at the free ends of the arms. The arms with the hooks and pointed terminals are duplicates of each other and alike at each side of the device. The hooks are formed by bending or doubling the wire inwardly upon itself at each side, at the upper ends of which hooks, respectively, the pointed terminals or needles $e\,e$ extend and incline toward each other, substantially in a plane, as shown.

The space $g$, inclosed by the arms and adjacent parts of the device, is substantially rectangular in the form of the device in which I prefer to make it. Narrow recesses $h\,h$ or reduced portions of the space $g$ are inclosed within the hooks, as shown, adjacent to the inner faces of the respective arms.

In using the device the arms are spread or sprung apart by hand at their free ends, which latter are then placed over or upon the part of the mass at which the device is to be attached. The free ends are then pressed together upon the mass, which causes the pointed terminals or needles to penetrate the sack or the rind or other part of the meat.

Now when the mass of meat is lifted by means of the device the material of the bag or sack which contains the meat, or the rind of the latter, with perhaps a portion of the meat, will pass down into the recesses $h\,h$ in the hooks, and the weight of the mass will be supported by the stiff hooks, thus relieving the needles or terminals $e\,e$ of much of the strain and prevent them from being bent or broken by the weight of the meat. The sharp bends at $d\,d$ render the metal very stiff and firm at those points and capable of safely supporting the weight of the mass of meat without danger of breaking.

The opening or loop $f$, resulting from forming the spring-bend $a$ serves as a convenient finger-rest while handling the attached mass, and it also serves for passing over a hook or other device in the act of suspending the mass of meat.

The arms $b\,b$, which are preferably parallel, are both bent sharply, forming dull rounded ends $d\,d$, with the inner members $i\,i$ of the respective hooks parallel with the adjacent arms. When the device is put upon a body of meat, the openings in the latter or in the sack formed by the device are elongated, forming short vertical slits. This results partly from the fact that the needles and the parts *i i* of the hooks respectively form angles, and thus cause the openings made by them to be longer vertically than horizontally, and partly on account of the pull or severe strain of the mass of meat upon the hooks, which latter tend to cut slightly upward into the meat or the sack. On account of this when handling the meat after the device is in place thereon any downward pressure against the device at *a* will tend to cause the rounded ends *d d* to enter said slits and so pass inside instead of outside of the rind or the sack, and thus prevent the device from being detached from the mass by accident.

The device is preferably made wide at *k k* to allow ample space for the portion of the mass of meat that necessarily enters between the arms when the device is attached to the meat.

What I claim as my invention is—

1. A meat-hook comprising a single piece of spring material the central portion of which is formed into a resilient supporting-bend, and the remaining portion is formed into a frame, the tip end of each side of which is pointed, a portion of each arm of the frame adjacent its end being doubled back upon itself and forming a narrow recess or space between it and the side, and the portion between the said doubled portion and the tips being inclined inwardly, whereby the tips are caused to normally stand near each other, and the tips, the inclined, and the doubled portions and the sides of the frame all lying in the same plane, substantially as set forth.

2. A meat-hanger composed of a wire body with integral prongs having shoulders, and a space below the shoulders to support the weight of the meat.

In witness whereof I have hereunto set my hand, this 25th day of July, 1895, in the presence of two subscribing witnesses.

LAWRENCE S. TRAVERS.

Witnesses:
JOHN W. TRAHER,
GEO. R. BROWN.